April 28, 1925.
J. W. GURLEY
FLUID PUMP OR MOTOR
Filed Oct. 24, 1924
1,535,464
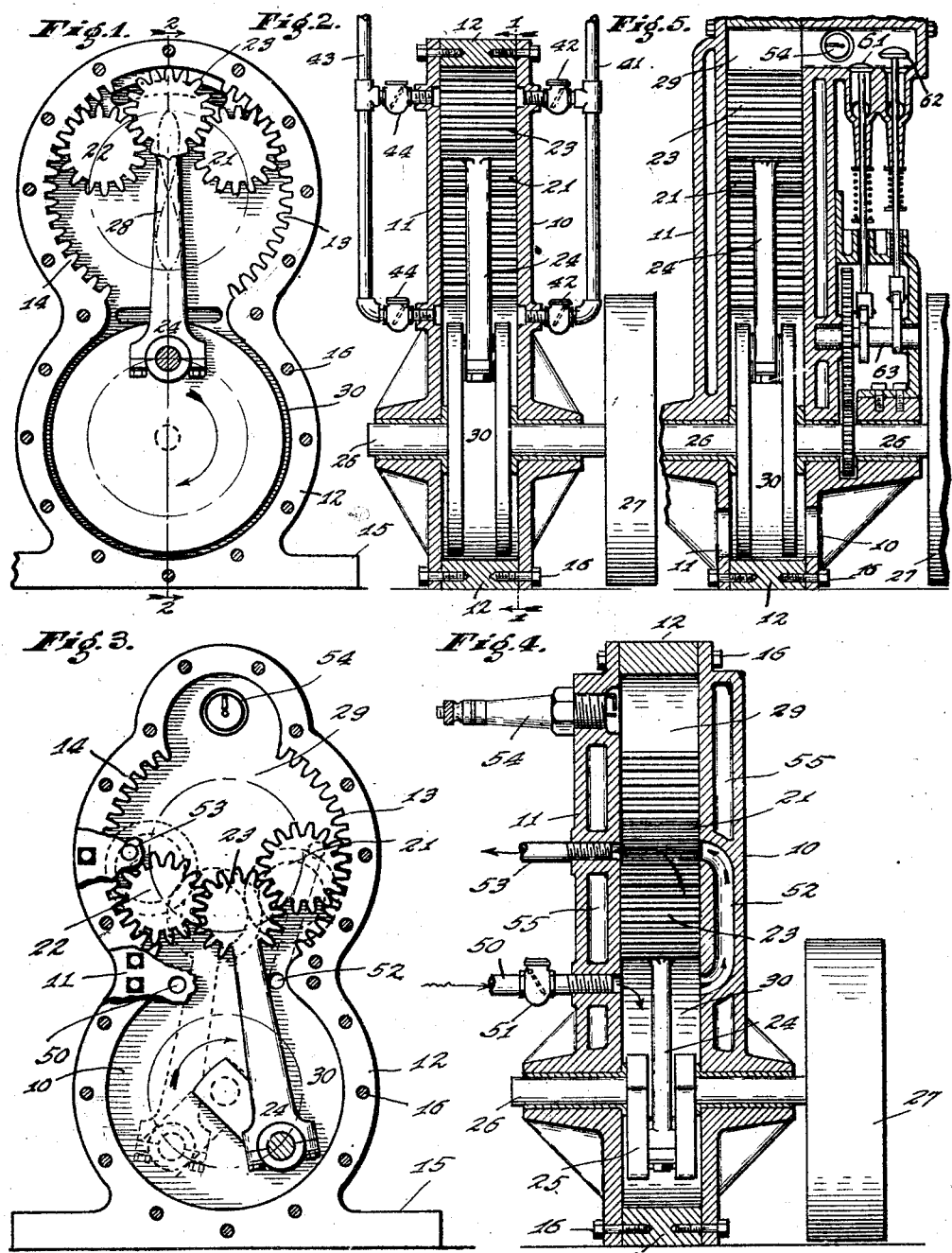
INVENTOR
JOHN W. GURLEY,
BY
ATTORNEY Patented Apr. 28, 1925.

1,535,464

UNITED STATES PATENT OFFICE.

JOHN W. GURLEY, OF INDIANAPOLIS, INDIANA.

FLUID PUMP OR MOTOR.

Application filed October 24, 1924. Serial No. 745,549.

*To all whom it may concern:*

Be it known that I, JOHN W. GURLEY, a citizen of the United States, residing at Indianapolis, in the county of Marion and State of Indiana, have invented a new and useful Fluid Pump or Motor, of which the following is a specification.

It is the object of my invention to produce a fluid-pressure device, such as a pump or motor, having certain advantages, which will appear more particularly hereinafter. Among such advantages are simplicity of construction, elimination of piston-rings, and reduction of friction.

In carrying out my invention, in general, I provide a flat casing or housing which internally has two parallel flat walls joined by two curved walls (which may be parts of the same circle), which curved walls are provided with internal gear teeth with which mesh two hypocycloidal gears slidingly fitting between the two parallel walls; and a third gear which meshes with the two hypocycloidal gears. The third gear is conveniently connected by a piston rod to a crank-shaft, desirably by a rigid connecting rod; which causes the oscillation of the third gear about its axis in the operation of the device, as well as a reciprocation toward and from the crank-shaft. The three gears are of such pitch, size, and shape that they remain constantly in mesh, and that the two outer gears remain in mesh with the internal teeth on the curved walls of the casing, as the third gear travels upon rotation of the crank shaft. The simplest construction, and the one I think most desirable, contemplates having the two internally toothed curved walls formed as fragments of the same circular internal gear, and the two hypocycloidal gears and the third gear all of equal size and each of a pitch diameter equal to one-third that of such internal gear.

As the crank-shaft rotates, the third gear moves toward and from the crank-shaft, and oscillates on its own axis, and this produces a rolling movement of the two hypocycloidal gears on the curved walls as well as on the third gear; so that the three moving gears together constitute in effect a piston, and the space on either side of the three moving gears is alternately made smaller and larger during such movement. This change in chamber size may be utilized as a fluid pump, whether of liquids or gases, and whether single-acting or double-acting; or as a fluid-pressure motor, of any style, such as an engine supplied with fluid pressure from the outside (as a steam engine), or as an internal combustion engine.

The accompanying drawing illustrates my invention, in several of the forms it may take: Fig. 1 is a transverse vertical section of a double-acting pump embodying my invention, taken substantially on the line 1—1 of Fig. 2; Fig. 2 is a vertical axial section taken substantially on the line 2—2 of Fig. 1; Figs. 3 and 4 are views similar to Figs. 1 and 2, but showing my invention applied in connection with a two-cycle internal combustion engine; and Fig. 5 is a view similar to Fig. 2, but showing my invention applied in connection with a four-cycle internal combustion engine.

In all these forms of my invention, there is a casing formed of two side walls 10 and 11, having flat parallel inner surfaces; connected by a spacing member 12 which has two curved internal walls 13 and 14, which have internal gear teeth and desirably consist of segments of the same circular internal gear. The spacing member 12, which may be provided with supporting feet 15, is suitably fastened in place between the two side walls 10 and 11, as by screws 16. The abutting walls of these members may be machined flat, which facilitates construction.

Two hypocycloidal gears 21 and 22 slidingly fit between the flat side walls 10 and 11, and mesh respectively with the two internal-gear walls 13 and 14. Each of these gears has a pitch diameter less than the pitch radius of such curved walls. In the preferred construction, the pitch diameters of the gears 21 and 22 are each one-third of the pitch diameter of the gear of which the toothed walls 13 and 14 form segments. A third gear 23 also slidingly fits between such side walls 10 and 11, and meshes with both gears 21 and 22; and is of a pitch diameter equal to the difference between the sum of the diameters of the gears 21 and 22 and the pitch diameter of the aforesaid internal gear. That is, in the preferred construction, the gear 23 also has a pitch diameter equal to one-third that of such internal gear, so that the three gears 21, 22, and 23 are of equal size. The gear 23 is connected, desirably by a connecting rod 24 rigid with said gear, to a crank 25 of a crank-shaft 26. This crank-shaft is mounted in suitable bearings in the side walls 10 and 11, and may be provided with a fly-wheel 27.

In operation, as the crank-shaft 26 is rotated, the gear 23 is moved toward and from such crank-shaft, rolling on the gears 21 and 22, which in turn roll on the internally toothed walls 13 and 14. This movement of the gear 23 toward and from the crank-shaft 26 is accompanied by an oscillation of such gear on its own axis, as well as by a swinging of the gear from side to side with respect to the center line of the casing. In consequence, the center of the gear 23 travels approximately along a path 28 such as is indicated in chain lines. By reason of this combination of movements, as the gear 23 is descending upon the rotation of the crank-shaft 26 in the direction of the arrow the gear 22 is always lower than is the gear 21, while as the gear 23 is rising the gear 22 is always higher than is the gear 21; but the two gears 21 and 22 swing to the same height as the gear 23 reaches the high point and the low point of its movement. As the gear 23 rises, the three gears 21, 22, and 23 all approach the top of the casing, and thus makes smaller the chamber 29 between such gears and the top of the casing and make larger the chamber 30 between such gears and the bottom of the casing; while when the gear 23 descends, the three gears 21, 22, and 23 all approach the bottom of the casing, and thus make the chamber 29 larger and the chamber 30 smaller.

These two chambers 29 and 30 may either or both be closed chambers, the chamber 29 being shown as a closed chamber in all three examples shown of the invention, and the chamber 30 being shown as a closed chamber in Figs. 1 to 4 inclusive and as an open chamber in Fig. 5. The chamber 30 is the crank-case, but may be also used as a fluid-moving chamber, such as a pump chamber if the device is a pump or as a crank-case-compression chamber if it is a two-cycle internal combustion engine.

In the use of my invention as a pump or compressor, as shown in Figs. 1 and 2, a fluid-supply pipe 41 is connected with one or both chambers 29 and 30 according as the device is a single-acting or a double-acting pump, these figures showing it as a double-acting pump. Such connection is by way of suitable valves 42 which admit fluid from the pipe 41 into the respective chambers. Similarly, a fluid-discharge pipe 43 is connected with one or both of said chambers, by valves 44 which admit fluid from the respective chambers into such pipe 43. The valves 42 and 44 are here shown as simple check-valves, but that is merely for simplicity of illustration. The connection of the pipes 41 and 43 to the chambers may be at any suitable points, so long as the two pipes are never connected to the same chamber in the movements of the gears; but desirably the openings of such pipes into the chambers are at points which lie outside of the paths of travel of the gears.

When the shaft 26 is rotated by external power, it produces movements of the gears 21, 22, and 23, to increase or decrease alternately the size of each of the chambers 29 and 30; and the valves 42 and 43 operate in the usual manner of pump valves or compressor valves, to permit ingress of fluid from the pipe 41 into the chambers as they respectively increase in size, and outlet of fluid therefrom into the pipe 43 as they respectively decrease in size.

In the use of my invention as a two-cycle internal combustion engine, I find it desirable to use the chamber 29 as the explosion chamber and the chamber 30 as a crank-case-compression chamber. A mixture-supply pipe 50 leads from the usual carbureter into the chamber 30 at some convenient point, and is provided with a check-valve 51 which permits inflow of such mixture into the chamber but prevents back-flow from the chamber to the carbureter. A by-pass 52 leads from the chamber 30 to the chamber 29, to interconnect such chambers at the proper point in the cycle. The lower end of the by-pass 52 is desirably always open to the chamber 30; but the upper end is closed by the gear 21 throughout most of the cycle, and is only uncovered while the gear 21 is at the low point of its path of travel. An exhaust passage 53 opens from the chamber 29, to carry off the products of combustion. The opening of this exhaust passage into the chamber 29 is closed by the gear 22 during the greater part of the cycle, and is only uncovered while such gear is at the low point of its travel. Ignition is produced by a spark-plug 54, whose electrodes are within the chamber 29. Desirably the chamber 29 is water-jacketed, by water-passages 55 in the side walls 10 and 11.

In the operation of the two-cycle motor, rotation of the crank-shaft 26 causes the gas within the chamber 29 to be compressed as the gears 21, 22, and 23 ascend, and causes explosive mixture to be drawn into the chamber 30 at the same time. At or near the top of the stroke, ignition is produced by the spark-plug 54, and the force of the explosion acts to force the gears 21, 22, and 23 downward. As these gears descend, the gear 22 is in advance of the gear 21, as regards vertical movement. As the bottom of the stroke is approached, the opening to the exhaust passage 53 is uncovered by the gear 22, to permit the exhaust of the products of combustion. This relieves the pressure within the explosion chamber 29. Shortly after this relief of pressure, the gear 23 as it swings to the left (Fig. 3) lowers the gear 21 sufficiently to uncover the upper end of the by-pass 52; whereupon the explosive mixture in the crankcase 30, which explosive mixture has been compressed during the descent of the gears 21, 22, and 23, rushes through the by-pass into the chamber 29 to supply the explosive mixture for the next explosion. As the cycle continues, the gear 22 rises to close the exhaust opening to the pipe 53, and shortly thereafter the gear 21 rises to close the upper end of the by-pass 52; and as the three gears rise the explosive mixture which is trapped in the chamber 29 is compressed, as already explained for the preceding cycle.

In the use of my invention as a four-cycle internal combustion engine, as shown in Fig. 5. I also use the chamber 29 as the explosion chamber; but leave the chamber 30 open at least for breathing. The upper end of the chamber 29 is provided with inlet and outlet openings, of any suitable character, controlled by an inlet valve 61 and an outlet valve 62; which may be operated by a suitable cam on a cam-shaft 63 geared to the crank-shaft 26 to operate at half crank-shaft speed, as is usual with cam-shafts in four-cycle engines. The cams are timed to open the valves on the usual intake and exhaust strokes of a four-cycle engine, and to hold them closed at other times; and ignition is produced by the spark-plug 54 at about the end of the usual compression stroke, to cause the explosion which produces the usual power stroke.

In all these constructions, I find it desirable to maintain the spacing member 12 intact, and to connect all other parts through the side walls 10 and 11. Thus in the pump of Figs. 1 and 2, the pipes 41 and 43 are connected to the chambers 29 and 30 through such side walls. Similarly, in the two-cycle internal combustion engine of Figs. 3 and 4, the pipes 50 and 53 are connected to their respective chambers through the side wall 11, in which the spark plug 54 is also mounted; the by-pass 52 is located in the side wall 10; and the pipes 55 for the water jacketing are in the two side walls. In the same way, in the four-cycle internal combustion engine of Fig. 5, the inlet and exhaust passages are provided in one of the side walls.

I claim as my invention:—

1. In combination, a casing having internally two opposite flat walls and two curved walls, said curved walls being provided with internal gear teeth constituting parts of the same internal gear, two hypocycloidal gears meshing with the teeth of said two curved walls, a third gear meshing with said two hypocycloidal gears, and a crank-shaft having a crank connected to said third gear by a connecting rod rigid with said gear, said casing being provided with inlet and exhaust passages, and said three gears fitting between said parallel flat walls.

2. In combination, a casing having internally two opposite flat walls and two curved walls, said curved walls being provided with internal gear teeth, two hypocycloidal gears meshing with the teeth of said two curved walls, a third gear meshing with said two hypocycloidal gears, and a crank-shaft having a crank connected to said third gear by a connecting rod rigid with said gear, said casing being provided with inlet and exhaust passages, and said three gears fitting between said parallel flat walls.

3. In combination, a casing having internally two opposite flat walls and two curved walls, said curved walls being provided with internal gear teeth constituting parts of the same internal gear, two hypocycloidal gears meshing with the teeth of said two curved walls, a third gear meshing with said two hypocycloidal gears, and a crank-shaft having a crank connected to said third gear, said casing being provided with inlet and exhaust passages, and said three gears fitting between said parallel flat walls.

4. In combination, a casing having internally two opposite flat walls and two curved walls, said curved walls being provided with internal gear teeth, two hypocycloidal gears meshing with the teeth of said two curved walls, a third gear meshing with said two hypocycloidal gears, and a crank-shaft having a crank connected to said third gear, said casing being provided with inlet and exhaust passages, and said three gears fitting between said parallel flat walls.

5. The combination set forth in claim 3, with the addition that said three gears are of equal size, each having a pitch diameter equal to one-third that of said internal gear.

6. The combination set forth in claim 4, with the addition that said two hypocycloidal gears are of equal size, and that said third gear is of suitable size to lie in the straight line between said hypocycloidal gears, when the latter are in mesh with said internally toothed curved walls at a maximum distance of separation between such walls.

In witness whereof, I have hereunto set my hand at Indianapolis, Indiana, this 22d day of October, A. D. one thousand nine hundred and twenty four.

JOHN W. GURLEY.